United States Patent
Huybrechts

(10) Patent No.: US 7,091,278 B2
(45) Date of Patent: Aug. 15, 2006

(54) AQUEOUS TWO-COMPONENT COATING COMPOSITIONS

(75) Inventor: Jos Huybrechts, Turnhout (BE)

(73) Assignee: E. I. duPont de Nemours and Company, Wilmington, DE (US)

( * ) Notice: Subject to any disclaimer, the term of this patent is extended or adjusted under 35 U.S.C. 154(b) by 261 days.

(21) Appl. No.: 10/733,999

(22) Filed: Dec. 10, 2003

(65) Prior Publication Data

US 2005/0131132 A1    Jun. 16, 2005

(51) Int. Cl.
    *C08G 18/06* (2006.01)
(52) U.S. Cl. .................. 524/560; 524/502; 524/556; 525/162; 525/163
(58) Field of Classification Search ............. 524/502, 524/556, 560; 525/162, 163
    See application file for complete search history.

(56) References Cited

U.S. PATENT DOCUMENTS

| | | | |
|---|---|---|---|
| 5,157,069 A * | 10/1992 | Campbell | ............ 524/500 |
| 5,539,022 A | 7/1996 | Schmidt et al. | |
| 5,670,600 A | 9/1997 | Nienhaus et al. | |
| 5,773,513 A | 6/1998 | Huybrechts et al. | |
| 6,162,886 A | 12/2000 | Bremer et al. | |

FOREIGN PATENT DOCUMENTS

| | | |
|---|---|---|
| DE | 4445355 A1 | 6/1996 |
| EP | 0856533 A | 8/1998 |
| WO | WO 95/02005 A | 1/1995 |

OTHER PUBLICATIONS

The European Search Report Application No. EP 04025888, Mailed: Mar. 10, 2005.

* cited by examiner

*Primary Examiner*—David W. Wu
*Assistant Examiner*—Satya Sastri

(57) ABSTRACT

Aqueous coating compositions comprising
A) at least one water-dilutable (meth)acrylate copolymer with a hydroxyl value of 200 to 280 mg KOH/g and
B) at least one polyisocyanate cross-linking agent with free isocyanate groups, the (meth)acrylate copolymers being the reaction product of
  a) 10–50% by weight of at least one glycidyl ester derived from an aliphatic saturated monocarboxylic acid branched in alpha position,
  b) 0–60% by weight of at least one polyalkylene glycol (meth)acrylate,
  c) 0–45% by weight of at least one hydroxy-functional olefinic unsaturated monomer different from component b),
  d) 3–40% by weight of at least one olefinic unsaturated monocarboxylic acid,
  e) 0–40% by weight of at least one vinyl aromatic monomer and
  f) 0–40% by weight of other olefinic unsaturated monomers different from monomers a) to e),
wherein component d) is used in molar excess of component a) and the % by weight of components a) to f) adding up to 100%.

8 Claims, No Drawings

AQUEOUS TWO-COMPONENT COATING COMPOSITIONS

BACKGROUND OF THE INVENTION

1. Field of the Invention

The invention relates to aqueous two-component coating compositions for automotive and industrial coatings based on hydroxy-functional acrylate copolymers and polyisocyanate cross-linking agents, which are preferably used in vehicle refinishing.

2. Description of Related Art

For ecological reasons water based paints are increasingly used in automotive and industrial coatings. The aim of this is to keep the proportion of organic co-solvents in the water based paints as small as possible. The water-dilutable binders, for example acrylate copolymers, used in water paints are usually manufactured in organic solvents, the solvents being at least partly distilled off at a later stage.

In U.S. Pat. No. 5,773,513 aqueous coating compositions based on water-dilutable acrylate resins are described, the acrylate resins being manufactured in several stages by polymerization in organic solvents. In this procedure a mono-epoxy ester and organic solvent are introduced, in a first stage unsaturated acid-functional monomers, unsaturated hydroxy-functional monomers and vinyl aromatic monomers are added and polymerized and in a second stage the remaining unsaturated acid-functional monomers and, possibly, further unsaturated monomers are added and polymerised. After neutralization and transfer to the aqueous phase surplus solvent is distilled off. Besides the fact that the distilling off represents an additional step in the binder manufacture, there is also the disadvantage of incompatibility of the acrylate resins with hydrophobic polyisocyanates.

EP 619 329 (U.S. Pat. No. 5,539,022) describes water-dilutable dispersions of acrylate copolymers with hydroxyl values of 40 to 200 mg KOH/g, which were manufactured by reaction of 5 to 40% by weight of a glycidyl ester derived from a branched aliphatic saturated monocarboxylic acid in alpha position, 0 to 30% by weight of a diester derived from an olefinic unsaturated dicarboxylic acid, 0 to 70% by weight of a vinyl aromatic hydrocarbon, 0 to 60% by weight of an alkyl ester derived from an olefinic unsaturated carboxylic acid, 2 to 40% by weight of an olefinic unsaturated carboxylic acid and 5 to 40% by weight of a hydroxy alkyl ester derived from an olefinic unsaturated carboxylic acid. From the water-dilutable dispersions of acrylate resins manufactured in this way, water-dilutable clear coat baking enamels or water-dilutable solid-color topcoat baking enamels are produced by admixing an amino resin as crosslinking agent.

Thus, there is a need for water-dilutable two-component coating compositions based on hydroxy-functional polymers and polyisocyanates with free isocyanate groups, which contain acrylate copolymers being able to be manufactured without difficulty and without compatibility problems in the substance or in the presence of only very small quantities of organic solvents. The hydroxy-functional (meth)acrylcopolymers should also be highly compatible with hydrophobic polyisocyanates, i.e. polyisocyanates that are not especially hydrophilically modified and be easily miscible with them. The miscibility should be guaranteed without having to add larger amounts of organic co-solvents and/or high shear 0rates. Furthermore, the coatings should display a high solids content at spray viscosity.

SUMMARY OF THE INVENTION

The invention thus relates to aqueous coating compositions comprising
A) at least one water-dilutable (meth)acrylcopolymer with a hydroxy number of 200 to 280 mg KOH/g, preferably of 220 to 280 mg KOH/g, particular preferably of 240 to 270 mg KOH/g and an acid number of 15 to 70 mg KOH/g, preferably of 25 to 55 mg KOH/g and
B) at least one polyisocyanate cross-linking agent with free isocyanate groups, the (meth)acrylate copolymers being the reaction product of
 a) 10–50% by weight, preferably 15–35% by weight of at least one glycidyl ester derived from an aliphatic saturated monocarboxylic acid branched in alpha position,
 b) 0–60% by weight, preferably 10–40% by weight of at least one polyalkylene glycol(meth)acrylate,
 c) 0–45% by weight, preferably 30–45% by weight of at least one hydroxy-functional olefinic unsaturated monomer that is different from component b),
 d) 3–40% by weight, preferably 7–20% by weight of at least one olefinic unsaturated monocarboxylic acid,
 e) 0–40% by weight of at least one vinylaromatic monomer and
 f) 0–40% by weight of other olefinic unsaturated monomers that are different from the monomers a) to e),
 wherein component d) is used in molar excess of component a) and the % by weight of components a) to f) adding up to 100%.

DETAILED DESCRIPTION OF THE EMBODIMENTS

The term (meth)acrylic as used here and hereinafter should be taken to mean methacrylic and/or acrylic.

It has surprisingly been found that the (meth)acrylate copolymers A) with high hydroxy-functionality can be manufactured easily using mass polymerization and can be converted into solvent-free or low-solvent water-dilutable dispersions with the required low viscosities, which in turn can be easily mixed by hand with hydrophobic polyisocyanates, i.e. not specially hydrophilically modified polyisocyanates, to become coatings that have good resistance to chemicals and moisture and mechanical influences that, for example, cause scratching and marring.

Hereafter the invention is described in more detail. The water-dilutable (meth)acrylate resins A) have a number average molecular weight (Mn) of 1000 to 5000 g/mol, preferably, from 2000 to 4000 g/mol, a weight average molecular weight (Mw) of 3000 to 40000 g/mol, preferably, from 5000 to 20000 g/mol, a hydroxy number of 200 to 280 mg KOH/g, preferably, 220 to 280 mg KOH/g, in particular, preferably, 240 to 270 mg KOH/g and an acid number of 15 to 70 mg KOH/g, preferably, 25 to 55 mg KOH/g. They are produced by radical polymerization, preferably, by means of mass polymerization, of the aforementioned components a) to f).

Component a) relates to glycidyl esters derived from aliphatic saturated monocarboxylic acids with a tertiary or quaternary carbon atom in the alpha position. It is preferred to use glycidyl esters of saturated alpha, alpha-dialkylalkane-monocarboxylic acids with 5 to 13 C atoms in the acid molecule, in particular, preferably, 9 to 11 C atoms in the acid molecule. The glycidyl ester derived from versatic acid is particularly preferred. Components suitable for component a) are obtainable commercially, for example, under the name of Cardura®. Component a) forms a hydroxy-functional reaction product with component c) during the course of production of (meth)acryl copolymers, and this product can be radically copolymerized.

Component b) relates to hydroxy-functional reaction products of (meth)acrylic acid with polyalkylene glycols. Compounds with the following general formula are particularly used for component b)

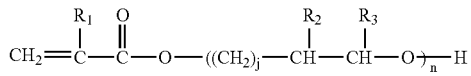

where $R_1$=H or methyl; $R_2$=H or methyl; $R_3$=H or methyl; j=0–3 and n=1–10.

Preferred polyalkylene glycol(meth)acrylates have 2 to 4 carbon atoms in the residual alkylene, n is preferably 3 to 6, 5 to 6 is particularly preferred. The polyalkylene(meth) acrylates have, for example, hydroxy values of 120 to 160 mg KOH/g. It is preferable to use polyethylene glycol(meth) acrylates and polypropylene glycol(meth)acrylates. It is particularly preferable to use polypropylene glycol(5)methacrylate with an average molecular weight of 360 to 390 g/mol. Components suitable for component b) are obtainable commercially, for example under the name of Bisomer® PPM5S, PPM6E, PEM6E, PPA6.

Component c) relates to hydroxy-functional olefinic unsaturated monomers, which are different from component b) and which are not reaction products from component a) and component d). Examples of component c) are hydroxyalkyl esters derived from alpha, beta-olefinic unsaturated monocarboxylic acids with primary or secondary hydroxyl groups. These can include, for example, hydroxyalkyl esters from acrylic acid, methacrylic acid, crotonic acid and/or iso-crotonic acid. Hydroxyalkyl esters derived from (meth) acrylic acid are preferred. The hydroxyalkyl groups can contain, for example, 1 to 10 C atoms, preferably 2 to 6 C atoms. Examples of suitable hydroxyalkyl esters of alpha, beta-olefinic unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth) acrylate. Examples of suitable hydroxyalkyl esters with secondary hydroxyl groups are 2-hydroxypropyl (meth) acrylate, 2-hydroxybutyl (meth)acrylate, 3-hydroxybutyl (meth)acrylate.

Reaction products from hydroxyalkyl (meth)acylates with lactones can also be used for component c). In this way, at least part of the aforementioned hydroxyalkyl esters of alpha, beta-unsaturated monocarboxylic acids can be modified. The modification results from an esterification reaction taking place by opening the lactone ring. During the reaction, new hydroxyl groups are formed in the final phase in the form of hydroxyalkyl ester groups matching the appropriate lactone. The aforementioned are examples of hydroxyalkyl (meth)acrylates that can be used. Suitable lactones are, for example, those that contain 3 to 15 C atoms in a ring, it is possible for the rings to have different substituents. Preferred lactones are gamma-butyrolactone, delta-valerolactone, epsilon-caprolactone, beta-hydroxybeta-methyl-delta-valerolactone, lambda-laurinlactone or mixtures thereof. Epsilon-caprolactone is particularly preferred. The reaction products preferred are those of one mol of a hydroxyalkyl ester of an alpha, beta-unsaturated monocarboxylic acid and 1 to 5 mol, preferably an average of 2 mols, of a lactone. Modification of the hydroxyl groups of the hydroxyalkyl esters with the lactone can take place before, during or after carrying out the copolymerization reaction.

Component d) relates to radical polymerizable olefinic unsaturated carboxyl-functional monomers. Examples of suitable components d) are olefinic unsaturated mono- and/or dicarboxylic acids such as (meth)acrylic acid, maleic acid, fumaric acid, crotonic acid and isocrotonic acid as well as the corresponding semi-esters and anhydrides of olefinic unsaturated dicarboxylic acids. The alcohol component of these carboxylic acids has generally 1 to 8 C atoms. Unsaturated fatty acids with 8 to 22 C atoms can also be used, such as, for example, linolenic acid, linoleic acid, oleic acid or dehydrated castor acid. The use of (meth)acrylic acid is particularly preferred. The molar amount of component d) must always be in excess of the molar amount of component a).

Component e) relates, for example, to styrene, vinyl toluene and/or tertiary butyl styrene.

Component f) relates to olefinic unsaturated monomers, which differ from monomers a) to e). It can include olefinic unsaturated monomers that, apart from having at least one olefinic double bond, do not contain any other reactive functional groups. Examples of suitable unsaturated monomers with no other functional groups are esters of unsaturated carboxylic acids with aliphatic monohydric branched or linear as well as cyclic alcohols with 1 to 20 C atoms. Examples of unsaturated carboxylic acids are acrylic acid, methacrylic acid, crotonic acid and isocrotonic acid. Esters of (meth)acrylic acid are preferred. Examples of (meth) acrylic acid esters with aliphatic alcohols are methylacrylate, ethylacrylate, isopropylacrylate, tert.-butylacrylate, n-butylacrylate, isobutylacrylate, 2-ethylhexylacrylate, laurylacrylate, stearylacrylate and appropriate methylacrylates. Examples of (meth)acrylic acid esters with cyclic alcohols are cyclohexylacrylate, trimethylcyclohexylacrylate, 4-tert. butylcyclohexylacrylate, isobornylacrylate and appropriate methacrylates. Examples of (meth)acrylic acid esters with aromatic alcohols are benzyl(meth)acrylates.

Examples of further suitable unsaturated monomers without other functional groups are vinyl esters, such as, for example, vinyl acetate, vinyl propionate and vinyl esters derived from branched saturated monocarboxylic acids in alpha position, for example, vinyl esters derived from saturated alpha, alpha' dialkylalkane monocarboxylic acids and vinyl esters derived from saturated alpha-alkylalkane monocarboxylic acids each with 5 to 13 carbon atoms, preferably, 9 to 11 carbon atoms in the molecule.

Small amounts of olefinic polyunsaturated monomers can also be used. These are monomers with at least 2 radically polymerizable double bonds. Examples of these are divinylbenzene, 1,4-butanediol diacrylate, 1,6-hexanediol diacrylate, neopentylglycoldimethacrylate, glycerine dimethacrylate.

(Cyclo)aliphatic (meth)acrylic acid esters with 1 to 10 C atoms in the (cyclo)alkyl group are preferred for component f).

Component f) also includes olefinic unsaturated monomers with other functional groups, for example (meth) acrylamides and their derivatives, (meth)acrylonitriles, silane-functional unsaturated monomers, such as, for example, methacryloxypropyl trialkoxysilanes, vinyl trialkoxysilanes, each with, for example, 1 to 5 carbon atoms in the alkoxy group, acetoacetyl-functional unsaturated monomers, such as, for example, acetoacetoxy ethylmethacrylate, unsaturated monomers containing urea groups, such as, for example, ethylene urea ethyl methacrylate and unsaturated monomers containing urea groups, such as, for example, dialkylaminoethyl (meth)acrylates with, for example, 1 to 5 carbon atoms in the alkyl group.

The hydroxy-functional (meth)acrylic copolymers contained in the coating compositions according to the invention are produced by radical copolymerization, preferably by mass polymerization. The term mass polymerization means polymerization which is usually carried out without solvents. In many cases, however, the presence of a small amount of solvent of up to 5, preferably up to 3 parts per weight, is possible. The advantage of the mass polymerization is, that the produced copolymers contain no or only small amounts of organic co-solvents. No distillation step is required to produce the final aqueous copolymer dispersion. But the hydroxy-functional (meth)acrylic copolymers may produced also by other methods of polymerization.

Polymerization following the usual method by a person skilled in the art can take place for example at temperatures of 120 to 200° C. In the present case, mass polymerization is carried out in component a) as a reactive thinner. In general, this is done in such a way that at least a part of component a) is presented on its own and at the aforementioned temperatures, preferably at 160 to 180° C., a mixture of components b) to f) and any residual component a) together with a polymerization initiator and, if necessary, a regulator are added and left to react in a mass polymerization until a reaction level of at least 95%, preferably at least 98% is attained. As already previously mentioned, a hydroxy-functional olefinic unsaturated reaction product from components a) and c) is thus produced, which can itself take part in copolymerization. Depending on the molar amounts of components a) and c) used, (meth)acrylcopolymers either free of carboxyl groups or containing carboxyl groups can be obtained as required.

To produce an aqueous dispersion, the (meth)acrylcopolymer thus obtained may then be dissolved with water-dilutable organic co-solvents, for example, with 5 to 20% by weight, based on (meth)acrylcopolymer, and is then partially or wholly neutralized by the addition of the appropriate amount of a base. The organic co-solvent can also be added wholly or partially together with components b) to f). Then the (meth)acrylcopolymer, which is neutralized partially or wholly, is converted into an aqueous dispersion by normal or inverse dilution with water. The individual monomers a) to f) are each introduced in such molar amounts that the finished (meth)acrylcopolymer has the hydroxyl and acid numbers defined at the beginning. It is preferred to use 10 to 40% by weight of component b), which leads to advantages in film formation of the final coating composition.

All usual polymerization initiators for radical copolymerization can be considered, such as, aliphatic azo compounds, for example, azobis-isobutyronitrile or azobis-methylbutyronitrile, diazylperoxides, for example, dibenzoylperoxide, dialkylperoxides, for example, di-tertiary-butylperoxide or di-tertiary-amylperoxide, alkylhydroperoxides, for example, tertiary-butylhydroperoxide or peresters, for example, tertiary-butylperoxybenzoate. Regulators, for example alcohols, such as, butanol or mercaptanes, such as, dodecylmercaptane, can be used to regulate the molar mass.

Suitable organic co-solvents are inter alia water-dilutable monovalent or bivalent alcohols or glycols, for example, ethanol, n-propanol, isopropanol, n-butanol, isobutanol, ethylene glycol, diethylene glycol, triethylene glycol, propylene glycol and glycerine, water-dilutable monoethers derived from polyhydric alcohols, for example methoxypropanol or methoxybutanol, as well as water-dilutable glycol ethers, such as, for example, butylglycol or butyldiglycol.

The aqueous coating compositions, according to the invention, also contain polyisocyanates with free isocyanate groups (component B) as cross-linking agents. Examples of the polyisocyanates are any number of organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, above 5 and below 3,000 mPas.

These polyisocyanates are familiar to the person skilled in the art and can be obtained commercially.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine.

The polyisocyanate cross-linking agents can be used individually or mixed.

These are polyisocyanate cross-linking agents commonly used in the paint industry, and are described in detail in the literature and are also obtainable commercially.

The polyisocyanates can also be used in the form of isocyanate-modified resins.

Apart from the hydroxy-functional (meth)acrylic copolymers A), the coating compositions according to the invention can also contain other hydroxy-functional binders. Examples of these other hydroxy-functional binders are those hydroxy-functional binders known to the person skilled in the art, which are used in the formulation of aqueous coatings. Examples of other hydroxy-functional binders which can be used are hydroxy-functional polyester, alkyd, polyurethane and/or poly(meth)acrylate resins different from the (meth)acrylic copolymers A). These other hydroxy-functional binders can also be present in a modified form, for example, in the form of (meth)acrylated polyesters or (meth)acrylated polyurethanes. They can be used individually or mixed. The proportion of other hydroxy-functional binders can amount to 0 to 50% by weight based on the amount of hydroxy-functional (meth)acrylic copolymers according to the invention which is used. The coating compositions can also contain low molecular reactive components, so-called reactive thinners, which are able to react with the cross-linking components. Examples of these are hydroxy- or amino-functional reactive thinners.

The hydroxy-functional (meth)acrylic copolymers A) and the polyisocyanates B) are used in such proportion that the equivalent ratio of hydroxyl groups of (meth)acrylic copolymers A) to the isocyanate groups of cross-linking components B) can be 5:1 to 1:5, for example, preferably, 3:1 to 1:3, and in particular preferably 1.5:1 to 1:1.5. If other hydroxy-functional binders and reactive thinners are used, their reactive functions should be taken into account when calculating the equivalent ratio.

The coatings, according to the invention, contain water, for example, 40–70% by weight and possibly small amounts of organic solvents, e.g., up to 10.% by weight, based on the entire coating composition. These are organic solvents used in the paint industry known to the person skilled in the art, for example, those which were mentioned previously in the production of the polymers.

The coating compositions, according to the invention, can contain pigments and/or fillers. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, graphite effect pigments and iron oxide laminae. Examples of fillers are silicon dioxide, barium sulphate, talcum, aluminium silicate, magnesium silicate.

The coating compositions can contain usual additives. These additives are additives usually used in the paint industry. Examples of such additives are light stabilisers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, curing accelerators for the cross-linking reaction of OH-functional binders, for example, organic metallic salts, such as, dibutyl tin dilaurate, zinc naphthenate and compounds containing tertiary amino groups, such as, triethylamine for the cross-linking reaction with polyisocyanates. The additives are added in the usual amounts familiar to the person skilled in the art.

Either transparent or pigmented coating compositions can be produced. Since this is a two-component system, the binder components A) containing hydroxyl groups, possibly with pigments, fillers and additives generally used for paint, and the polyisocyanate components B) may only be mixed together shortly before application. In principle, the coatings can still be adjusted to spray viscosity with water and/or organic solvents prior to application.

The coating compositions, according to the invention, can be applied using known methods, in particular, by spray application. The coating compositions obtained can be cured at room temperature or forced at higher temperatures, for example, up to 80° C., preferably, at 20 to 60° C. They can, however, even be cured at higher temperatures of, for example, 80 to 160° C.

The coating compositions, according to the invention, are suitable for automotive and industrial coatings. In the automotive coatings sector, the coatings can be used for both vehicle production line painting and vehicle and vehicle part refinishing. For vehicle production line painting stoving (baking) temperatures of 60 to 140° C., for example, are used, preferably 110 to 130° C. For refinishing curing temperatures of, for example, 20° C. to 80° C., in particular, 40 to 60° C. are used.

The coating compositions, according to the invention, can be formulated, for example, as solid-color topcoats or as transparent clear coats and used in the manufacture of the outer solid-color topcoat layer of a multilayer coating or in the production of the outer clear coat layer of a multilayer coating. The present invention thus also concerns the use of the coating compositions, according to the invention, as topcoat coatings and as clear coatings as well as a method for producing multilayer coatings, the solid-color topcoat and transparent clear coat layers of multilayer coatings, in particular being manufactured from the coating compositions, according to the invention.

The coating compositions in the form of a solid-color topcoat can be applied, for example, to normal one-component or two-component filler layers. However, the coatings according to the invention can also be applied and cured as a filler layer, for example, on normal primers, for example, two-component epoxide primers or on electrodeposition primers.

The coating compositions in the form of transparent clear coats can be applied, for example, using the wet-in-wet process on solvent-based or aqueous color and/or effect-giving basecoat layers. In this case, the color and/or effect-giving basecoat layer is applied to a substrate, precoated if necessary, in particular, to precoated vehicle bodies or parts thereof, prior to the application of the clear coat layer from the clear coat according to the invention. Following a drying period, if allowed for, both layers are cured together. Thus, for vehicle production line painting, drying can take place, for example, at 20 to 80° C. and for refinishing for 15 to 45 minutes at room temperature, depending on relative air humidity.

The coating compositions according to the invention are used to advantage in a multilayer coating to produce solid-color topcoat layers and transparent clear coat layers. The topcoat and clear coat layers possess good resistance to mechanical and weathering influences and exhibit good chemical resistance. The coating compositions according to the invention have a sufficiently high solids content at spray viscosity, for example, a solids content of up to 45% by weight. They contain only small amounts of organic co-solvents, usually not more than 10% by weight. The water-dilutable (meth)acrylate copolymers A) used in the aqueous coatings can be particularly used to advantage with the usual hydrophobically, i.e., not especially hydrophilically modified polyisocyanate cross-linking agents. They are highly compatible with the polyisocyanate cross-linking agents and, simply by mixing with these, can be converted into water-dilutable two-component coating compositions. This is particularly important for the application of two-component coating compositions in vehicle refinishing, where it should be ensured that components can be mixed simply by hand. It is known from prior art that normal paint polyisocyanates, which are relatively hydrophobic, i.e., not specially hydrophilically modified, can only be worked or mixed into aqueous coating compositions with difficulty, particularly if the working in takes place in the absence of large amounts of organic co-solvents and/or without high shear rates. The present invention solves this disadvantage satisfactorily. Further, an improved film formation can be observed, i.e., transparent defect-free films are achieved without the addition of large amounts of organic co-solvents.

The invention is described in more detail using the following examples.

EXAMPLES

Example 1

Preparation of Acrylic Copolymer 1

Into a reactor equipped with a propeller type of stirrer, a thermometer, condenser and monomer/initiator feeding system, 240 grams of Cardura® E10 (CE10) (Glycidyl ester of C10 versatic acid available from Resolution) were loaded and heated to about 165° C. A mixture of 450 grams 2-hydroxyethyl methacrylate (HEMA), 200 grams of Bisomer® PPM5S (PPM5) (Polypropyleneglycol monomethacrylate with molecular weight about 375 available from Laporte), 110 grams of acrylic acid (AA), 20 grams of Trigonox B (Di-tertiary butyl peroxide available from Akzo) and 10 grams of ethyleneglycol mono butylether (EGBE) were added over 5 hours to the reactor keeping the contents of the reactor at 165° C. After the feed 10 grams of EGBE were added, the contents of the reactor were cooled to 140° C. and held at this temperature for about 1 hour. Next the reactor was cooled further to 100° C. and 44.5 grams of dimethylamino ethanol (DMEA) were added.

In a next step the polymer blend was diluted with 1177 grams of water.

Test results:

Solids 44.3%

Viscosity: 3880 cP (Measured with Brookfield spindle 4 at 20 rpm) (1 cP=1 mPas)

Acid value (AN): 43.8 mg KOH/g pH 8.2

Mn/Mw=2400/7350 (Number and weight average molecular weight measured with GPC using polystyrene standards)

Hydroxyl value, calculated (OH): 278 mg KOH/g

Examples 2–5

Preparation of Acrylic Copolymers 2–5

The procedure of example 1 was followed only changing the monomer composition and the amount of water added to adjust for the solids content, if applicable.

|  | Examples | | |
|---|---|---|---|
|  | 1 | 2 | 3 |
| Composition | 24/45/20/11/0/0/0 | 24/40/25/11/0/0/0 | 24/45/0/11/0/20/0 |
| Solids/% | 44.3 | 44 | 38.7 |
| Viscosity (cP) | 3880 | 2180 | 14300 |
| pH | 8.2 | 7.5 | 8.3 |
| AN mg KOH/g | 43.8 | 44.2 | 46.2 |
| OH mg KOH/g | 278 | 264 | 248 |
| $M_n/M_w$ | 2400/7350 | 2200/6500 | 2500/8400 |

Composition: CE10/HEMA/PPM5/AA/S/LMA/IBMA
LMA = Lauryl Methacrylate
IBMA = Isobutyl Methacrylate
S = Styrene

|  | Examples | |
|---|---|---|
|  | 4 | 5 |
| Composition | 24/40/15/11/10/0/0 | 20/40/10/10/0/0/20 |
| Solids/% | 39.5 | 33.8 |
| Viscosity (cP) | 13800 | 1020 |
| pH | 8.6 | 8.3 |
| AN Mg KOH/g | 37.9 | 37.7 |
| OH mg KOH/g | 249 | 248 |
| $M_n/M_w$ | 2350/9800 | 2400/6900 |

Composition: CE10/HEMA/PPM5/AA/S/LMA/IBMA

Comparative Examples 6–8

The procedure of example 1 was followed only changing the monomer composition and adding water to adjust the solids content, if applicable.

Comparative examples 6–8: hydroxy value lower than according to invention

Comparative example 9: hydroxy value higher than according to invention

|  | Comparative Examples | | | |
|---|---|---|---|---|
|  | 6 | 7 | 8 | 9 |
| Composition | 30/15/15/12/28 | 25/17/15/10.5/32.5 | 20/20/15/9/36 | 24/50/15/11/0 |
| Solids/% | 38.9 | 39.6 | 40.4 | 39.1 |
| Viscosity (cP) | 110 | 300 | 400 | 1870 |
| pH | 8.5 | 8.7 | 8.8 | 6.9 |
| AN/mg KOH/g | 31 | 28.9 | 29.3 | 39.2 |
| OH/mg KOH/g | 153 | 151 | 153 | 292 |
| $M_n/M_w$ | 3500/32000 | 4400/54400 | 4400/60000 | 2300/7000 |

Composition: CE10/HEMA/PPM5/AA/S

Paint Examples 1–9

48.75 grams of a solution containing 80% Desmodur® 3600 (Bayer AG) in butyl glycol acetate was added to 100 grams of the acrylic copolymer dispersion of Example 1 under slight agitation. Next, 45.91 grams of deionized water were added while mixing slowly. After mixing for 2 minutes, drawdowns were prepared on glass having a wet film thickness of 84 micron using a doctor blade. The drawdowns were put in the oven and baked for 30 minutes at 60° C. and in another test for 30 minutes at 80° C. After cooling down, the glass plates were rated regarding film formation as below. For hardness measurements, the sample was sprayed in a wedge on a glass plate using a SATA NR95 HVLP gun and baked for 30 minutes at 60° C. Persoz hardness was measured after cool down and after 4 hours at a dry film thickness of 60 micron.

The other examples were tested similarly by adjusting the amount of the acrylic copolymer dispersions of examples 2–9 according to the OH value and the dilution to the same application viscosity.

Test results:

| Examples | Rating 60° C. (1) | Rating 80° C. (1) | Hardness (2) | Hardness (3) |
| --- | --- | --- | --- | --- |
| 1 | 7 | 7 | 75 | 190 |
| 2 | 6 | 6 | 48 | 160 |
| 3 | 7 | 7 | 80 | 160 |
| 4 | 7 | 7 | 120 | 230 |
| 5 | 6 | 6 | 95 | 210 |

| Comparative Examples: | Rating 60° C. (1) | Rating 80° C. (1) |
| --- | --- | --- |
| 6 | 2 | 2 |
| 7 | 2 | 2 |
| 8 | 2 | 2 |
| 9 | 1 | 1 |

(1) Rating: clarity of film:
7: Completely clear, 6: very very slight cloudy, 5: very slight cloudy, 4: slightly cloudy, 3: cloudy, 2: very cloudy - matt film, 1: white milky film
Hardness: measured according Persoz immediately after cooling down (2) and 4 hours later (3).

The above results show that the hydroxyl value is the important factor to control the compatibility with the polyisocyanate in a 2K water borne clear polyurethane formulation. Much improved film formation could be observed in the examples according to the invention in contrast to the comparative examples.

The invention claimed is:

1. Aqueous coating compositions comprising
   A) at least one water-dilutable (meth)acrylate copolymer with a hydroxyl value of 220 to 280 mg KOH/g and
   B) at least one polyisocyanate cross-linking agent with free isocyanate groups,
   wherein the (meth)acrylate copolymers being a mass polymerization reaction product of
   a) 15–35% by weight of at least one glycidyl ester derived from an aliphatic saturated monocarboxylic acid branched in alpha position,
   b) 10–40% by weight of at least one polyalkylene glycol (meth)acrylate,
   c) 30–45% by weight of at least one hydroxy-functional olefinic unsaturated monomer different from component b),
   d) 7–20% by weight of at least one olefinic unsaturated monocarboxylic acid,
   e) 0–40% by weight of at least one vinyl aromatic monomer and
   f) 0–40% by weight of other olefinic unsaturated monomers different from monomers a) to e),
   wherein component d) is used in molar excess of component a) and the % by weight of components a) to f) adding up to 100%, and wherein the aqueous coating compositions comprise maximally 10% by weight of organic solvents.

2. Aqueous coating compositions according to claim 1, wherein the (meth)acrylate copolymers having a hydroxyl number of 240 mg KOH/g to 270 mg KOH/g and an acid number of 25 to 55 mg KOH/g.

3. Aqueous coating compositions according to claim 1, wherein the (meth)acrylate copolymers having a number average molecular weight (Mn) of 1000 to 5000 and a weight average molecular weight (Mw) of 3000 to 40000.

4. Aqueous coating compositions according to claim 1, wherein component a) comprises a glycidyl esters of saturated alpha, alpha'-dialkylalkane-monocarboxylic acids with 9 to 11 C atoms in the acid molecule.

5. Aqueous coating compositions according to claim 1, wherein component b) comprises polyethylene glycol(meth) acrylates, polypropylene glycol(meth)acrylate or mixtures thereof.

6. A multilayer coating comprising a transparent clear coating of the aqueous coating composition according to claim 1.

7. A multilayer coating comprising a solid-color topcoat of the aqueous coating composition according to claim 1.

8. A vehicle refinishing process comprising applying the coating composition according to claim 1.

* * * * *